(12) United States Patent
Elangovan et al.

(10) Patent No.: US 10,885,712 B2
(45) Date of Patent: Jan. 5, 2021

(54) CAMERA POSE ESTIMATION METHOD FOR AUGMENTED REALITY MANUAL FOR CARS

(71) Applicant: NIO USA, Inc., San Jose, CA (US)

(72) Inventors: Vidya Elangovan, Cupertino, CA (US); Prashant Jain, San Jose, CA (US); Anthony Tao Liang, Palo Alto, CA (US); Guan Wang, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 52 days.

(21) Appl. No.: 15/648,271

(22) Filed: Jul. 12, 2017

(65) Prior Publication Data
US 2019/0019335 A1    Jan. 17, 2019

(51) Int. Cl.
| | | |
|---|---|---|
| *G06T 19/00* | (2011.01) | |
| *G06T 17/10* | (2006.01) | |
| *G06K 9/66* | (2006.01) | |
| *G06T 19/20* | (2011.01) | |
| *H04N 7/18* | (2006.01) | |

(Continued)

(52) U.S. Cl.
CPC ........... *G06T 19/006* (2013.01); *G06F 3/011* (2013.01); *G06F 3/0304* (2013.01); *G06F 9/453* (2018.02); *G06K 9/00664* (2013.01); *G06K 9/00671* (2013.01); *G06K 9/66* (2013.01); *G06T 7/70* (2017.01); *G06T 17/10* (2013.01); *G06T 19/20* (2013.01); *H04N 7/183* (2013.01); *G06T 2207/30244* (2013.01); *G06T 2207/30248* (2013.01)

(58) Field of Classification Search
None
See application file for complete search history.

(56) References Cited

U.S. PATENT DOCUMENTS

| | | |
|---|---|---|
| 8,948,456 B2 | 2/2015 | Schumacher |
| 2014/0310595 A1 | 10/2014 | Acharya et al. |

(Continued)

FOREIGN PATENT DOCUMENTS

DE      102004044718      3/2006

OTHER PUBLICATIONS

Su, Hang, et al. "Multi-view convolutional neural networks for 3d shape recognition." Proceedings of the IEEE international conference on computer vision. 2015.*

(Continued)

*Primary Examiner* — Zhengxi Liu
(74) *Attorney, Agent, or Firm* — Sheridan Ross P.C.

(57) ABSTRACT

Embodiments of the present disclosure are directed to an augmented reality based user's manual for a vehicle implemented as an application on a mobile device which allows the user to point a mobile phone, tablet or an augmented reality headset at any part of the vehicle interior or exterior and experience augmented annotations, overlays, popups, etc. displayed on images of real parts of the car captured by the user's mobile device. Embodiments provide for estimating the camera pose in six degrees of freedom based on the content of the captured image or video and using a neural network trained on a dense sampling of a three-dimensional model of the car rendered with realistic textures to identify and properly align the augmented reality presentation with the image of the vehicle being captured by the mobile device.

21 Claims, 9 Drawing Sheets

(51) Int. Cl.
  *G06T 7/70* (2017.01)
  *G06F 3/03* (2006.01)
  *G06K 9/00* (2006.01)
  *G06F 3/01* (2006.01)
  *G06F 9/451* (2018.01)

(56) References Cited

U.S. PATENT DOCUMENTS

2017/0085857 A1* 3/2017 Feng .................. G06T 7/70
2017/0308751 A1* 10/2017 Kim ................. G06K 9/00671
2017/0359523 A1* 12/2017 Rubinstein ............ G06T 5/005
2018/0240243 A1* 8/2018 Kim .................... G06N 3/0454

OTHER PUBLICATIONS

Author unknown, "Scene Graphs (Advanced Methods in Computer Graphics) Part 1", archived from http://what-when-how.com/advanced-methods-in-computer-graphics/scene-graph-classes-advanced-methods-in-computer-graphics/ on Oct. 13, 2012.*
Murase, Hiroshi, and Shree K. Nayar. "Visual learning and recognition of 3-D objects from appearance." International journal of computer vision 14.1 (1995): 5-24.*
Kanezaki, Asako. "Rotationnet: Learning object classification using unsupervised viewpoint estimation." arXiv preprint arXiv: 1603.06208 (2016).*
Lee, Jae Yeol, and Guewon Rhee. "Context-aware 3D visualization and collaboration services for ubiquitous cars using augmented reality." The International Journal of Advanced Manufacturing Technology 37.5-6 (2008): 431-442.*
Comport, Andrew I., et al. "Real-time markerless tracking for augmented reality: the virtual visual servoing framework." IEEE Transactions on visualization and computer graphics 12.4 (2006): 615-628.*
Jordan Golson, "Hyundai's augmented reality app helps idiot-proof car maintenance", published on Jan. 5, 2016, retrieved from https://www.theverge.com/2016/1/5/10712686/hyundai-augmented-reality-owners-manual-video-ar-ces-2016 on Aug. 17, 2020.*
Kendall et al., "PoseNet: A convolutional Network for Real-Time 6-DOF Camera Relocalization," Paper, arXiv:1505.07427v4 [cs.CV] Feb. 18, 2016, 9 pages.
Jia et al., "Deep Convolutional Neural Network for 6-DOF Image Localization," Paper, arXiv:1611.02776v1 [cs.CV] Nov. 8, 2016, 6 pages.

* cited by examiner

CAMERA POSE ESTIMATION METHOD FOR AUGMENTED REALITY MANUAL FOR CARS

FIELD

The present disclosure is generally directed to vehicle systems, in particular, toward providing an augmented reality manual for a vehicle.

BACKGROUND

A new car usually comes with several manuals in the form of booklets. While a lot of features of the car are documented in these manuals, they are in a hard-to-access format for the end user. The manuals usually get forgotten in the glove box and they are not opened until the owner is stuck with a problem related to the car. Even in that scenario, the owner often struggles to find the relevant pages where that specific feature or problem is discussed for troubleshooting. Hence, there is a need in the art for a more convenient and intuitive form of user manual which can be implemented, for example, on a mobile device such as a cellphone, tablet, etc. The owner's experience in learning about the car can be significantly enhanced by visually augmenting the information to appear to be overlaid in perspective over the real car.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
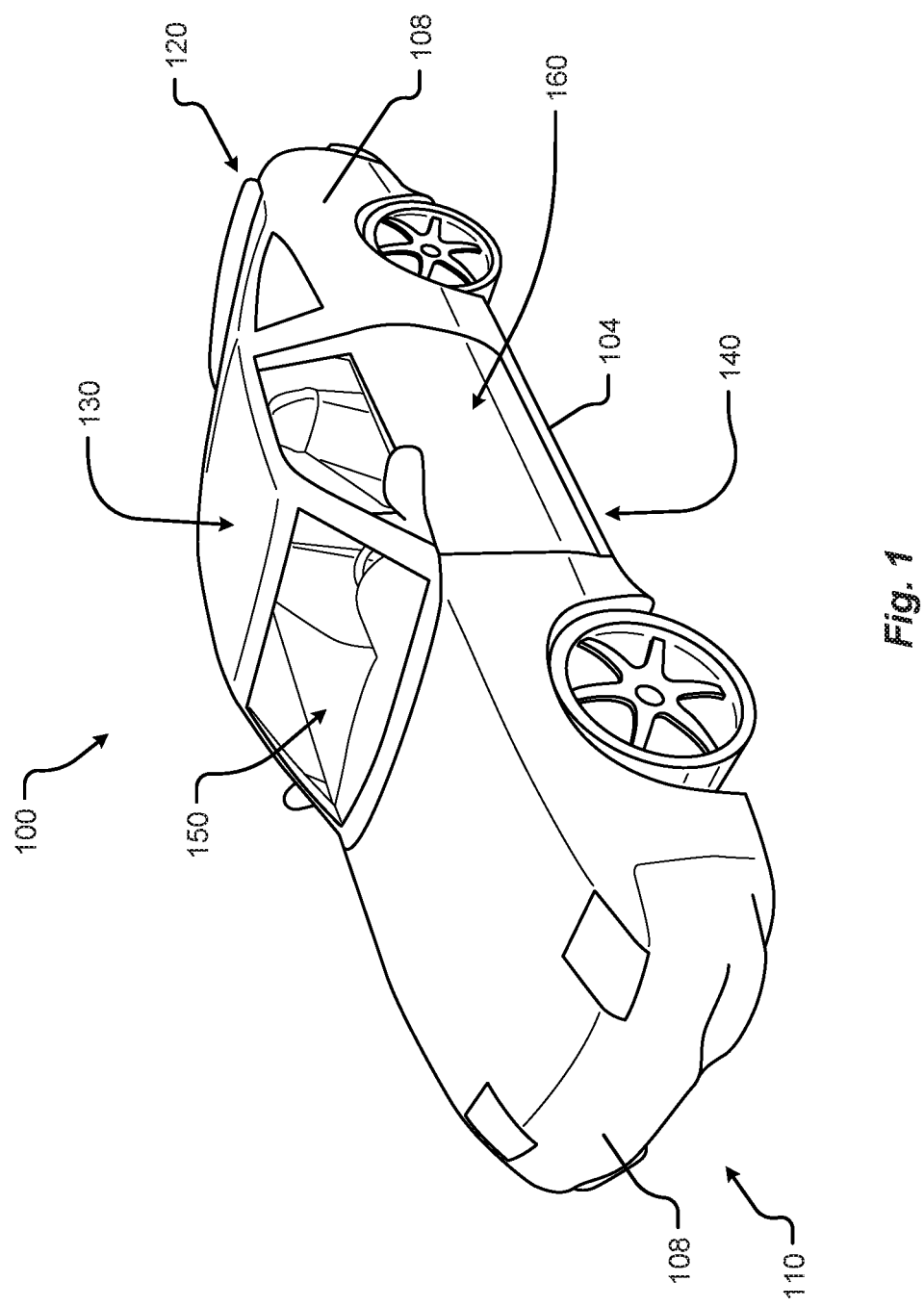
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

The vehicle 100 can be delivered with a user manual explaining features of the vehicle such as providing instructions for operation of audio systems, navigation systems, power seats, cruise control, autonomous or semi-autonomous driving functions, etc. The user manual can also provide maintenance schedules, troubleshooting information, warranty information, etc. Embodiments of the present disclosure are directed to a convenient and useful form of user manual which can be implemented, for example, on a mobile device such as a cellphone, tablet, etc. which can be provided and used in place of or in addition to a traditional paper user manual. More specifically, embodiments described herein are directed to an augmented reality based user's manual implemented as an application on a mobile device which allows the user to point the mobile phone, tablet or an augmented reality headset at any part of the car interior or exterior and experience augmented annotations, overlays, popups, etc. displayed on images of real parts of the car captured by the user's mobile device. Embodiments provide for estimating the camera pose in six degrees of freedom based on the content of the captured image or video and using a neural network trained on a dense sampling of a three-dimensional model of the car rendered with realistic textures to identify and properly align the augmented reality presentation with the image of the vehicle being captured by the mobile device. Deep network architectures and deep learning based solutions can be employed for the neural network training and inference.

Figure 2:
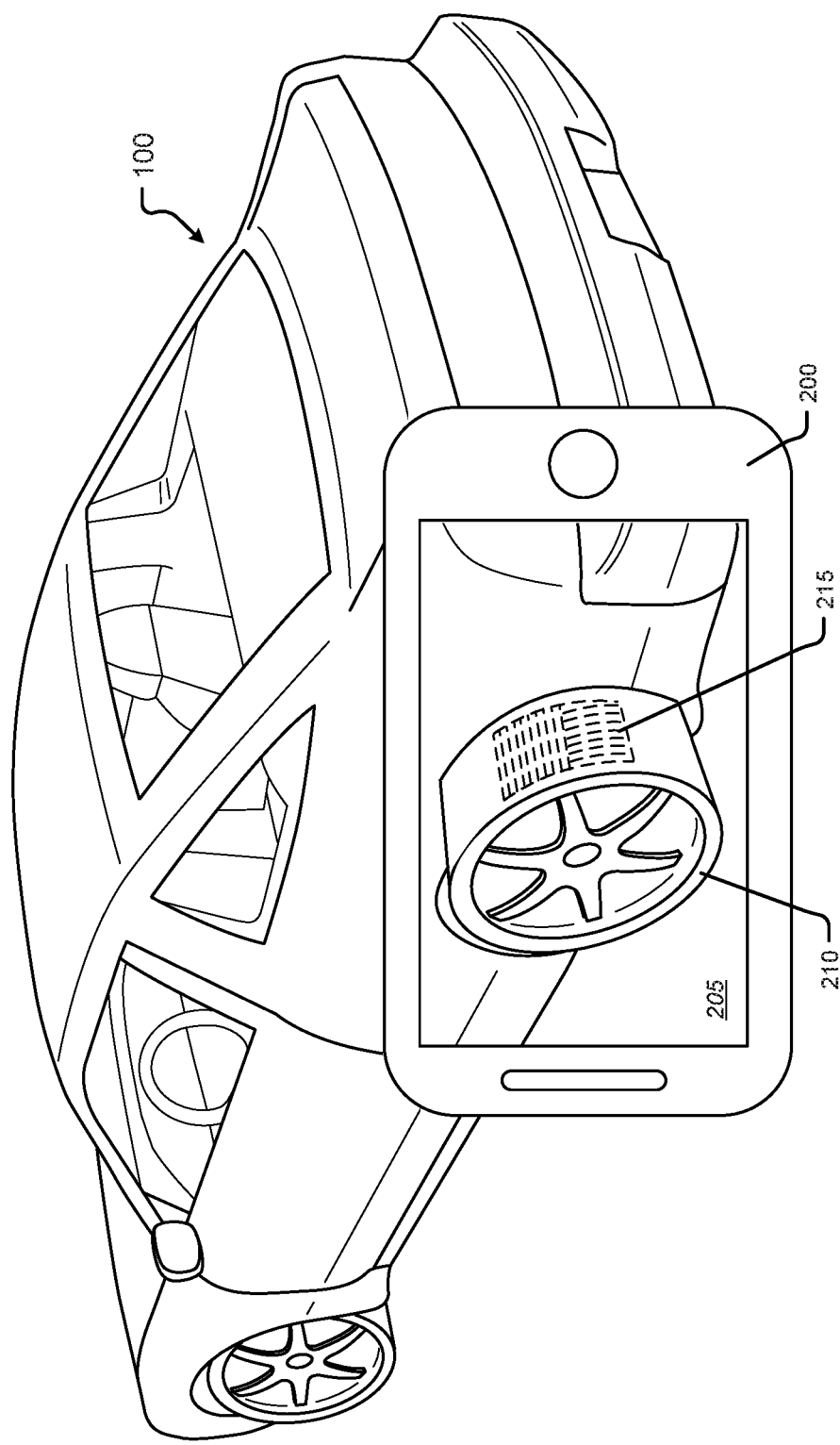
FIG. 2 illustrates use of an augmented reality manual for a vehicle according to one embodiment of the present disclosure.

FIG. 2 illustrates use of an augmented reality manual for a vehicle according to one embodiment of the present disclosure. More specifically, this example illustrates the vehicle such as described above and an augmented reality device 200. The augmented reality device 200 can comprise any of a number different types of devices that includes at least a camera (not shown here) and an ability to execute the application and perform the functions providing the augmented reality user manual as described herein. For example, the augmented reality device can comprise a mobile phone, a tablet, a mobile phone in split screen stereo mode with a headset such as Google Cardboard, an augmented reality headset or smart glasses held by hand or strapped to the users head such as Vive, Oculus, Hololens, Moverio, Meta etc. The augmented reality device 200 may have preloaded therein an application for execution by the device 200 and which will perform the functions of providing the augmented reality user manual as described below.

Alternatively, the user may locate and download the application to the device 200, e.g., through an app store, website, etc. as known in the art.

In use, the user of the augmented reality device 200 can point the camera of the device 200 at the vehicle 100 or a portion of the vehicle 100. An image of the vehicle 100 or portion of the vehicle 100 captured by the camera of the device 200 can be presented on the display 205 of the device 200. The image captured by the camera and presented on the display can be a single still image, a sequence of multiple still images, or a video. A feature 210 of the vehicle, such as a wheel in this example, captured in the image can be identified by the device 200 and content of the augmented reality user manual can be presented in the display 205 of the device 200 along with, e.g., overlaid on, the captured image. For example, a portion of a three-dimensional model of the vehicle, e.g., rendered in wire frame of other format, can be overlaid onto the feature to further highlight the feature, provide a view of portions of the feature hidden by the body or other parts of the vehicle, or otherwise provide an augmented view of the feature. Additionally, or alternatively, content 215 of the user manual can be rendered on the display 205 of the device 200 overlaid on the image or video of the feature 210. The content 215 can comprise, for example, text, illustrations, animations, etc. illustrating and or describing the feature further, e.g. illustrating the belts within the tire as shown here.

For a captured image, still or video, more than one feature may be captured within the field of view of the image. According to one embodiment, in such cases, a feature closest to the center of the field of view can be selected and illustrated. Alternatively, all features in the field of view can be illustrated at once. In yet other cases, the user can interactively select which feature they would like to use by touching the interface of the display 205 of the device 200.

According to one embodiment, models of each feature can be generated and organized in a hierarchy. For example, the hierarchy can start with an overview of a feature and proceed to more details at different levels of the hierarchy. The user can interactively drill down or navigate this hierarchy to ask for more details about the same feature, e.g., using the touch interface etc. This selection can proceed hierarchically. Here is an example of a hierarchical feature graph.

The content of the user manual can comprise various types of illustration or combination thereof, e.g., graphics, text, voice, etc. This content can be static or animated. For example, animations can show the flow of air out of a vent by rendering moving arrows denoting the flow. In other cases, interactions between multiple parts of the vehicle can be shown as an animation. For example, if the user initially points at the thermostat button or knob, the presented content can show an illustration for how to use the knob and then direct the user to move the camera to point at the heating air vent. In such cases, animated arrow can be used to point a direction to the camera.

According to one embodiment, three-dimensional textual annotations can be placed in the three-dimensional scene in addition to or instead of three-dimensional models of the feature(s). For example, text can be placed in a two-dimensional space of the display 205 of the device 200 with orthographic projection on top of the perspective rendering. In another example, three-dimensional text can be rendered in perspective into an appropriate three-dimensional location in the scene. According to one embodiment, augmented reality three-dimensional models and/or text illustrations can be accompanied with audio/voice instructions. In some cases, long text annotations can scroll in sync with audio/voice instructions.

The augmented reality illustration can be context sensitive and interactive to guide the user to solve a problem. For example, when the vehicle controllers detect that the tire pressure is low, the vehicle can ask the user to point the augmented reality device 200 at the tire of concern. When the tire is in field of view, an arrow pointing to the valve stem on the tire and a virtual tire gauge can be rendered prompting the user to check the tire pressure. Then, further guidance can be given to fill the tire with air.

In some cases, the augmented reality illustration can demonstrate a procedure that is hard to visualize or observe in person. For example, the augmented reality user manual can illustrate the series of steps involved in swapping a battery for the car for quick charging. The physical battery swap for an electric vehicle may happen in a closed environment where the owner cannot visually observe the procedure. In such cases, before or after the battery swap procedure, the owner can use the augmented reality device 200 to get a full three-dimensional illustration of the procedure by pointing at the battery area and asking for this illustration.

Figure 3:
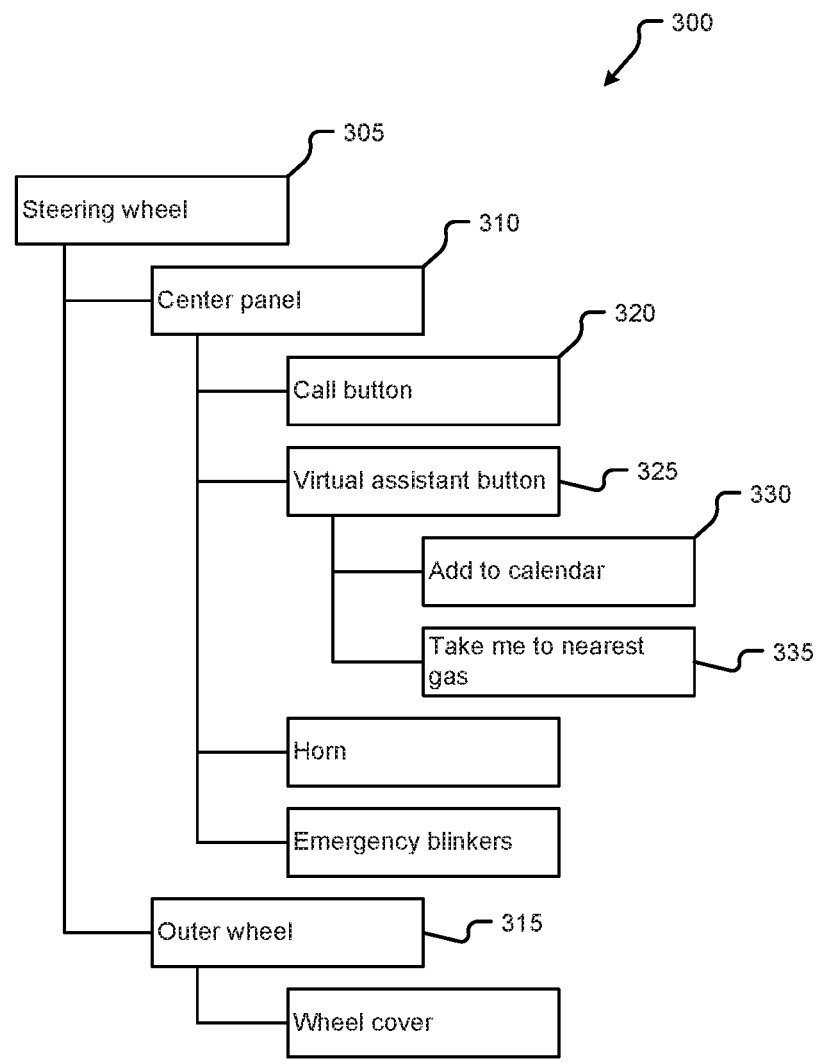
FIG. 3 illustrates a hierarchical feature graph for an augmented reality manual for a vehicle according to one embodiment of the present disclosure.

FIG. 3 illustrates a hierarchical feature graph for an augmented reality manual for a vehicle according to one embodiment of the present disclosure. As noted above, models of the various features of the vehicle 100 and/or content related to those features can be arranged in a hierarchical feature graph. The example here illustrates a portion of such a graph 300. Specifically, this example illustrates a graph 300 related to the steering wheel feature and includes a number of feature nodes 305-335. A top level feature node 305 can comprise the overview of the feature and next level nodes 310 and 315 can represent portions of the feature, e.g., the center panel 310 and outer wheel 315. Below this level of the hierarchy, child nodes can represent additional features, functions, or details of the various feature nodes. For example, below the center panel feature node 310, child feature nodes can comprise nodes for a call button 320, virtual assistant button 325, and others, e.g., horn, blinkers, etc. Similarly, child nodes below this level of the hierarchy can represent additional features, functions, or details of the various feature nodes. For example, below the virtual assistant button feature node 325, child feature nodes can comprise nodes for an "add to calendar" function 330, "take me to nearest gas" function 335, etc.

It should be noted that the graph 300 illustrated here represents one example of one particular feature for the sake of simplicity and clarity. However, features represented by the feature nodes and the hierarchy in which they are arranged can vary widely depending upon the exact implementation without departing from the scope of the present disclosure. Furthermore, it should be understood that the graph 300 represented here can be only one portion of a much larger graph representing numerous other features if the vehicle at various levels of an overall hierarchy for features of the vehicle. Other variations in the arrangement of the graph are contemplated and considered to be within the scope of the present invention.

Figure 4:
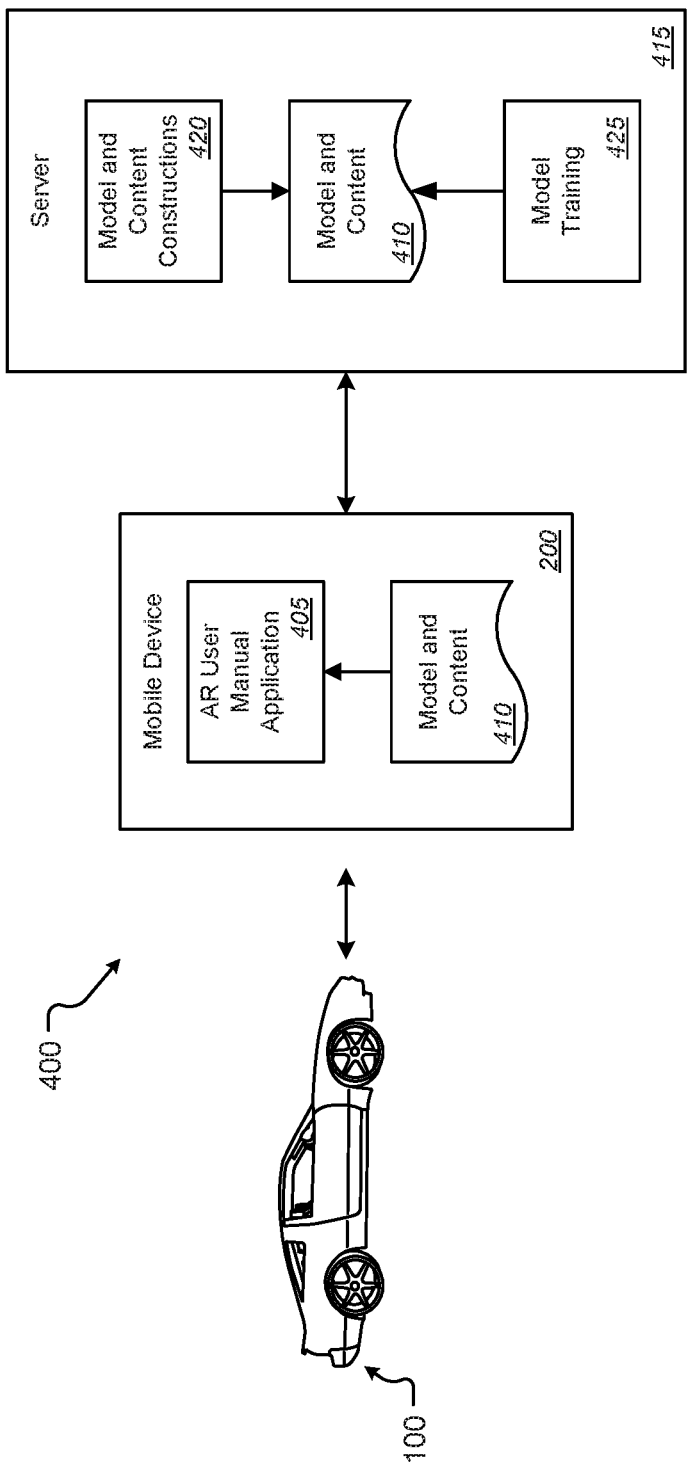
FIG. 4 is a block diagram illustrating elements of a system for providing an augmented reality manual for a vehicle according to one embodiment of the present disclosure.

FIG. 4 is a block diagram illustrating elements of a system for providing an augmented reality manual for a vehicle according to one embodiment of the present disclosure. As illustrated in this example, the system 400 can include the vehicle 100 and mobile device 200 as described above. The mobile device 200 can execute an augmented reality user manual application 405. According to one embodiment, the mobile device 200 can also maintain a model and content 410 related to one or more features of the vehicle 100. Generally speaking and as introduced above, the mobile device 200 can be used to capture an image of the vehicle 100. The augmented reality user manual application 405, as will be described in greater detail below, can then present on the display of the mobile device 200 the captured image along with various possible augmentations or enhancements using the model and/or content 410.

According to one embodiment, the system 400 can also include a server 415 such as a web server and/or application server. The server 415 can execute, for example, a model and content construction application 420. As will be described in greater detail below, the model and content construction application 420 can generate the model and content 410 for use by the augmented reality user manual application 405. The server 415 can also include a model training application or module 425. Generally speaking and as will be described in greater detail below, the model training application or module 425 can be used to train or adapt the models 410 used by the augmented reality user manual application 405 based on real-world use to improve the accuracy of results presented by the augmented reality user manual application 405.

It should be noted and understood that numerous variations on the arrangement of elements illustrated here are possible without departing from the scope of the present disclosure. For example, and in one implementation, the augmented reality user manual application 405 can be preinstalled on the mobile device 200 prior to purchase or can be located, downloaded, and installed on the mobile device 200 by the user after purchase, e.g., from the server 415 or elsewhere such as an application store etc. Similarly, the model and content 410 for the user manual can be preinstalled on the mobile device 200 or can be located and downloaded to the mobile device 200 by the user. In an alternative implementation, the model and content 410 may additionally or alternatively be maintained by the server 415 and accessed by the augmented reality user manual application 405 when executed and as needed to provide augmentation to a captured image. Similarly, the model training application or module 425 can be maintained by the server 415 and executed to train the model 410 based on information, e.g., camera pose estimations, made by the augmented reality user manual application 405 when executed and provided to the server 415 or may be downloaded to and executed on the mobile device 200 to train the model 410 stored thereon. Numerous other variations are possible and considered to be within the scope of the present disclosure.

Figure 5:
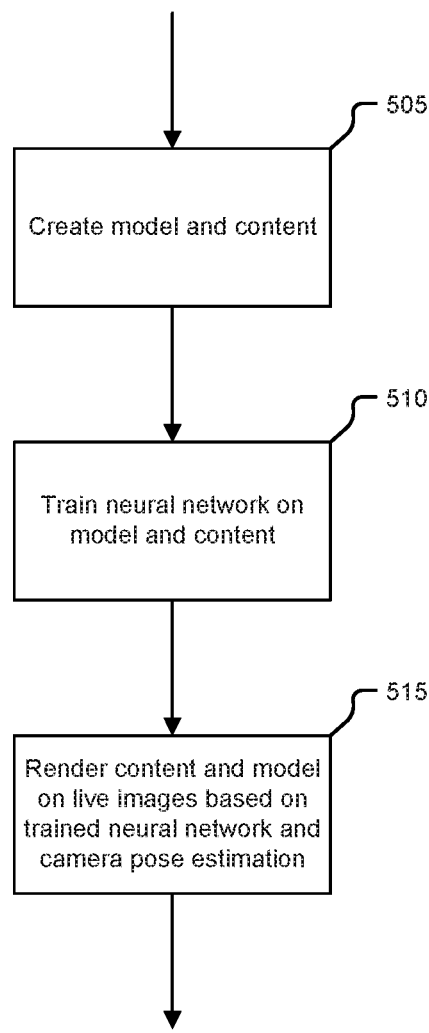
FIG. 5 is a flowchart illustrating an exemplary process for providing an augmented reality manual for a vehicle according to one embodiment of the present disclosure.

FIG. 5 is a flowchart illustrating an exemplary process for providing an augmented reality manual for a vehicle according to one embodiment of the present disclosure. Generally speaking, and as illustrated in this example, providing an augmented reality user manual for a vehicle can comprise creating 505 a three-dimensional model of the vehicle and content of the user manual. A highly accurate three-dimensional model of the car with high resolution textures of the interior and exterior can be create 505 using the Computer-Aided Design (CAD) model of the car used in the design and manufacturing processes. The polygon count of the model can be adjusted for rendering efficiency. If a CAD model is not available, three-dimensional scanning processes and three-dimensional modeling tools as known in the art can be used to create the model. Additional details of an exemplary process for creating 505 the three-dimensional model and content of the user manual will be described below with reference to FIG. 6.

Using the model, a neural network can be trained 510 to recognize a plurality of different views of the vehicle and associate each view with a portion of the three-dimensional model of the vehicle as well as to provide an estimation of a camera pose for that view. For example, a set of images of the interior and exterior of the vehicle from various points and at known poses can be generated based on model. For each of these images, the known pose can be saved along with the generated images and used for training the neural network which can then generate a camera pose for a received image. Additional details of an exemplary process for training 510 a neural network will be described below with reference to FIG. 7.

In use, the user can capture an image or video of a portion of the vehicle. A portion of the three-dimensional model of the vehicle and a portion of the content of the user manual can be rendered 515 by the mobile device overlaid on the image or video of the vehicle captured by the camera of the mobile device based on the image of the vehicle captured by the camera of the mobile device and the association of one or more views with one or more portions of the three-dimensional model of the vehicle in the trained neural network. Additional details of an exemplary process for rendering the overlay of the model and content will be described below with reference to FIG. 8.

Figure 6:
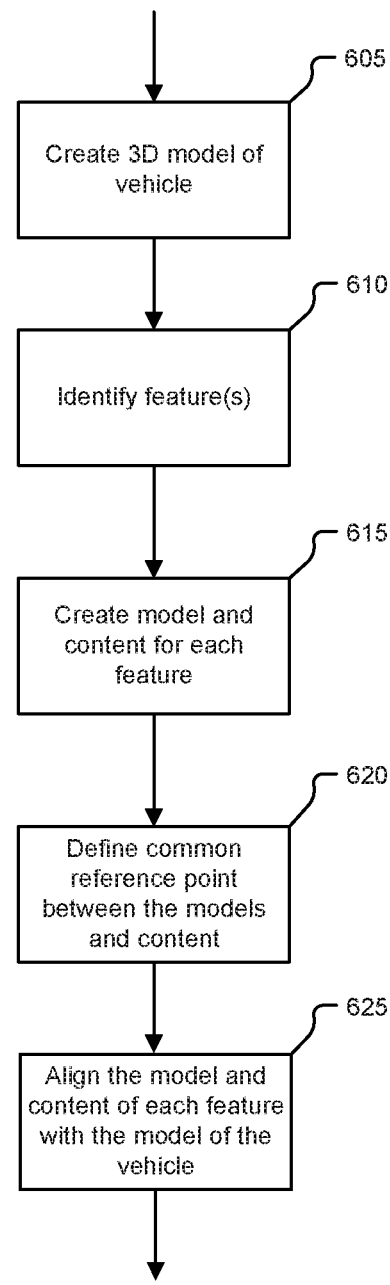
FIG. 6 is a flowchart illustrating an exemplary process for vehicle model and manual content creation according to one embodiment of the present disclosure.

FIG. 6 is a flowchart illustrating an exemplary process for vehicle model and manual content creation according to one embodiment of the present disclosure. As illustrated in this example, creating 505 the three-dimensional model of the vehicle and the content of the user manual further can comprise creating 605 a three-dimensional model of the interior of the vehicle and a three-dimensional model of the exterior of the vehicle. As noted above, a highly accurate three-dimensional model of the car with high resolution textures of the interior and exterior can be create 605 using the Computer-Aided Design (CAD) model of the car used in the design and manufacturing processes. The polygon count of the model can be adjusted for rendering efficiency. If a CAD model is not available, three-dimensional scanning processes and three-dimensional modeling tools as known in the art can be used to create the model.

One or more features of the vehicle can be identified 610. The features of the car identified 610 are those that can be illustrated, highlighted, etc. in the augmented reality manual. A three-dimensional model and content of the user manual can be created 615 for each identified feature. Again, three-dimensional models of the features can be created 615 using the CAD models of the features or using three-dimensional scanning processes and three-dimensional modeling tools as known in the art. Content can be created in any of a number of different ways known in the art to create voice, video, and/or textual explanations or descriptions, animations, popup or other supplemental illustrations, etc.

Once the three-dimensional model of the vehicle has been created 605 and a model and content has been created 615 for each identified 610 feature, a common reference point for the models and content can be defined 620. For example, the common reference point can be the centroid of the vehicle or other reference point that can be an origin of placement within the three-dimensional model of the vehicle of the models of the features or other content for the features. The three-dimensional model and content of the user manual for each identified feature can then be aligned 625 in position and orientation with at least one of the three-dimensional model of the interior of the vehicle or the three-dimensional model of the exterior of the vehicle based on the defined 620 common reference point.

Figure 7:
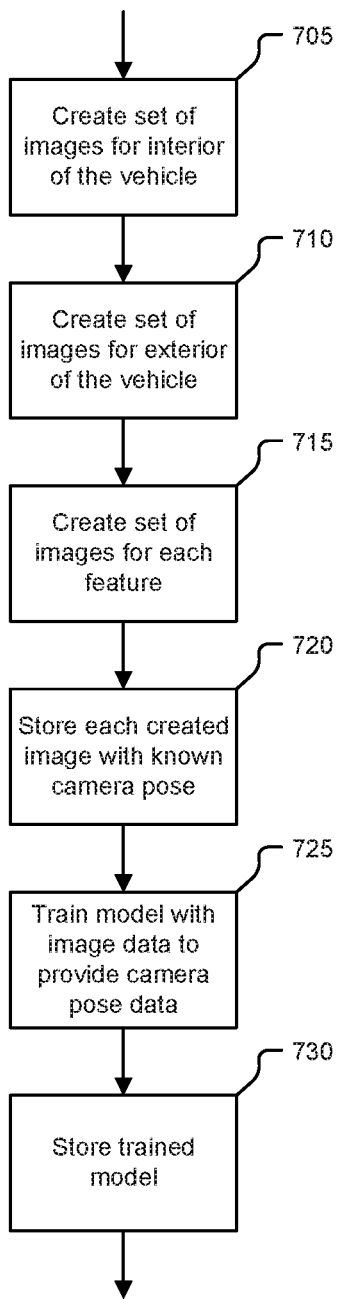
FIG. 7 is a flowchart illustrating an exemplary process for training of a model of a vehicle according to one embodiment of the present disclosure.

FIG. 7 is a flowchart illustrating an exemplary process for training of a model of a vehicle according to one embodiment of the present disclosure. As illustrated in this example, training 510 the neural network can comprise creating 705 a set of images of an interior of the vehicle on the model of the vehicle from a known camera position for each image. For example, creating 705 the set of images of the interior of the vehicle on the model of the vehicle can comprise positioning a virtual camera inside the center of the car. The virtual camera can be rotated (virtually) slowly around the x-axis to render a perspective image of the three-dimensional model with texture from each step of rotation, e.g., each 0.5-degree step. After a complete 360-degree rotation is covered, this process can be repeated by rotating the camera virtually around the y-axis and the z-axis. In some cases, this process can be repeated for other interior positions, e.g., centered at the driver's seat, centered at each passenger seat etc.

Similarly, a set of images of an exterior of the vehicle can be created 710 on the model of the vehicle from a known camera position for each image. For this set of images, the position of the virtual or real camera position can move around the car and point inwards to capture different viewpoints.

A set of images can also be created 715 for each of one or more features of the vehicle on the model of the vehicle from known camera positions. For example, from the positions used to create images of the interior of the vehicle, the virtual or real camera can be pointed at known features in the interior of the vehicle and images can be created or captured for those features.

The created 705, 710, and 715 images generated in this way can be saved 720 with the known camera pose (position and rotation) at which each was captured. That is, each created 705 image of the interior of the vehicle, each created 710 image of the exterior of the vehicle, and each created 715 image of each feature can be stored 720 with a known camera pose for the image based on the known camera position and orientation for the image.

The neural network can then be trained 725 with the image data for the stored created images and the known camera pose for each image. More specifically, the neural network can be trained to receive an image of the vehicle, e.g., from the camera of a mobile device implementing the augmented reality user manual, and provide camera pose data for the given image based on the saved images and known camera poses. Once trained 725, the neural network can be stored 730 and made available for use by devices implementing the augmented reality user manual.

Various other steps may be performed to improve the training of the neural network. According to one embodiment, real images of the interior and exterior of the vehicle taken from known camera poses can be added to the training dataset as a supplement or addition to the synthetic images. In such cases, the camera pose for each of the real images can be obtained by physically surveying the camera position relative to the vehicle or by calculating pose with computer vision by detecting physical augmented reality markers placed in the scene for the purpose of training. Additionally, or alternatively, synthetic training images can be created to simulate different lighting conditions such as low light, night light, dawn, dusk etc. by placing appropriate virtual lights in the scene before being created. Similarly, synthetic training images can additionally or alternatively be created by taking the original ones and applying different shade effects to simulate different weather conditions such as rain, snow, wind etc. This can be especially applicable for the exterior images. Additionally, or alternatively, synthetic training images can be created that add various types of noise to the image data to simulate real world sources of image noise. Other variations are contemplated and considered to be within the scope of the present disclosure.

Figure 8:
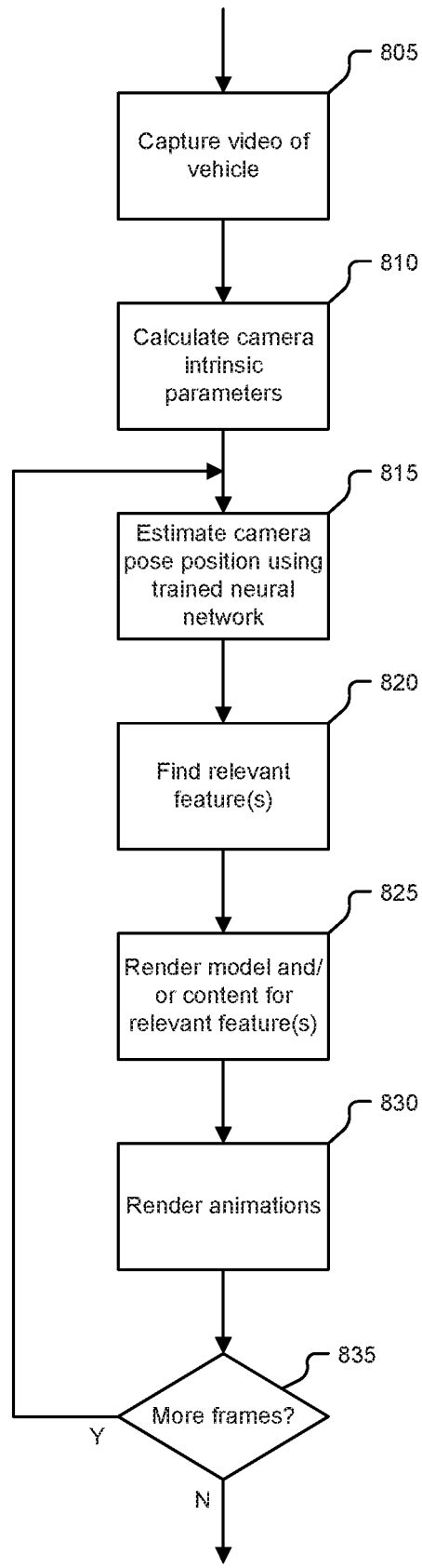
FIG. 8 is a flowchart illustrating an exemplary process for camera pose estimation according to one embodiment of the present disclosure.

FIG. 8 is a flowchart illustrating an exemplary process for camera pose estimation according to one embodiment of the present disclosure. As illustrated in this example, rendering 515 the portion of the model of the vehicle and the portion of the content of the user manual overlaid on the image of the vehicle can comprise capturing 805 an image of the vehicle through the camera of the mobile device. For example, the user can point mobile phone camera or tablet camera or augmented reality headset such as Google Cardboard at any part of the car that is of interest, e.g., the tire on the exterior or the steering wheel on the interior. The images captured through the camera of the device can comprise one or a sequence of more than one still images or a video.

One or more intrinsic parameters can be calculated 810 for the camera of the mobile device. Such parameters can include, but are not limited to, focal length, image sensor format, and principal point. Calculating such camera intrinsic parameters can be based on the make and model of mobile device as known in the art. If intrinsic parameters are not available from the manufacturer, they can be computed with a standard calibration procedure, for example, by moving a checkerboard in front of the camera and solving for the optimal parameters.

A camera pose position can be estimated 815 for the captured image using the stored trained neural network. Estimating 815 the camera pose position can comprise regressing the camera pose position and rotation of the camera using forward propagation on the stored trained neural network and the three-dimensional model of the vehicle. In some cases, estimating the camera pose position for the captured image can further comprise preprocessing the image to remove any obstructions in the scene such as, for example, passengers or other people in or around the vehicle. Additionally, or alternatively, regressing the camera pose position and orientation of the camera using forward propagation on the stored, trained neural network can further comprise tuning the model using the regressed camera pose to increase accuracy of estimations made using the model.

One or more relevant features of the vehicle can be found 820 based on the estimated camera pose position for the captured image. Finding 820 the one or more relevant features of the vehicle can comprise finding all features of the vehicle within a field of view of the camera represented by the captured image and finding as the relevant feature a feature closest to a center of the field of view of the camera. In some cases, finding 820 the one or more relevant features of the vehicle can comprise receiving a user selection of a feature through a voice command, touch selection on a touch screen of the device, or other form of user interface input. Finding 820 the one or more relevant features of the vehicle can additionally or alternatively comprise navigating down the feature hierarchy as described above and selecting one or more features based on user input or automatically based on context. In yet another example, finding 820 the one or more relevant features of the vehicle can comprise interactively guiding the user to point the mobile device towards another part of the vehicle based, for example, on a context of the user's interest or progress in a concurrent troubleshooting process.

One or both of an illustration of the three-dimensional model of each relevant feature or content of the user manual related to each relevant feature can be rendered 825 on a display of the captured image. The camera intrinsic parameters can be used to calculate the three-dimensional perspective projection matrix for rendering and the regressed camera pose can be used to calculate the model view matrix for rendering. Stated another way, rendering 825 on a display of the captured image one or both of an illustration of the three-dimensional model of each relevant feature or content of the user manual related to each relevant feature can comprise calculating a three-dimensional perspective projection matrix for the captured image using the calculated one or more intrinsic parameters for the camera of the mobile device and calculating a model view matrix of the three-dimensional model of each relevant feature based on the three-dimensional perspective projection matrix. In some cases, rendering on a display of the captured image one or both of an illustration of the three-dimensional model of each relevant feature or content of the user manual related to each relevant feature comprises rendering 830 one or more animations. Additionally, or alternatively, rendering on the display of the captured image one or both of an illustration of the three-dimensional model of each relevant feature or content of the user manual related to each relevant feature comprises rendering three-dimensional textual annotations in perspective, rendering two-dimensional textual annotations with orthographic projection, augmenting the display of the captured image with audio in the form of voice instructions or explanations through a speaker, or one or more combinations of using static three-dimensional rendering, animations, two-dimensional text, three-dimensional text, and audio.

As noted above, the captured image can comprise a video. In such cases, rendering the portion of the model of the vehicle and the portion of the content of the user manual overlaid on the image of the vehicle can further comprise determining 835 if there are additional frames of video to process, i.e., the video is still streaming. In response 835 determining there are frames remaining, processing can repeat 835 said estimating 815 camera pose position, finding 820 one or more relevant features of the vehicle based on the estimated camera pose position, and rendering 825 on the display of the captured image the illustration of the three-dimensional model of each relevant feature or the content of the user manual related to each relevant feature for each subsequent frame of the video until 835 no frames remain, i.e., the video stops.

Various other steps may be performed to improve the accuracy of the estimated camera pose. According to one embodiment, once a camera pose is estimated for a frame or image and the feature of interest is identified, image features such as corners can be tracked in the video or images from frame to frame instead of re-estimating the camera pose for every frame or image in a set of images. Additionally, or alternatively, once a camera pose is estimated for a frame or image and the feature of interest is identified, additional synthetic rendered images can be created on the fly for various steps of positions and rotations within the expected range of error in position and rotation. The newly rendered images can be compared with the original video frame or image to find the closest match and the position and rotation for the closest match can be used as the refined camera pose. In some cases, the newly rendered images can be added to the original training set and the neural network model can be retrained with the additional information. Other variations are contemplated and considered to be within the scope of the present disclosure.

Figure 9:
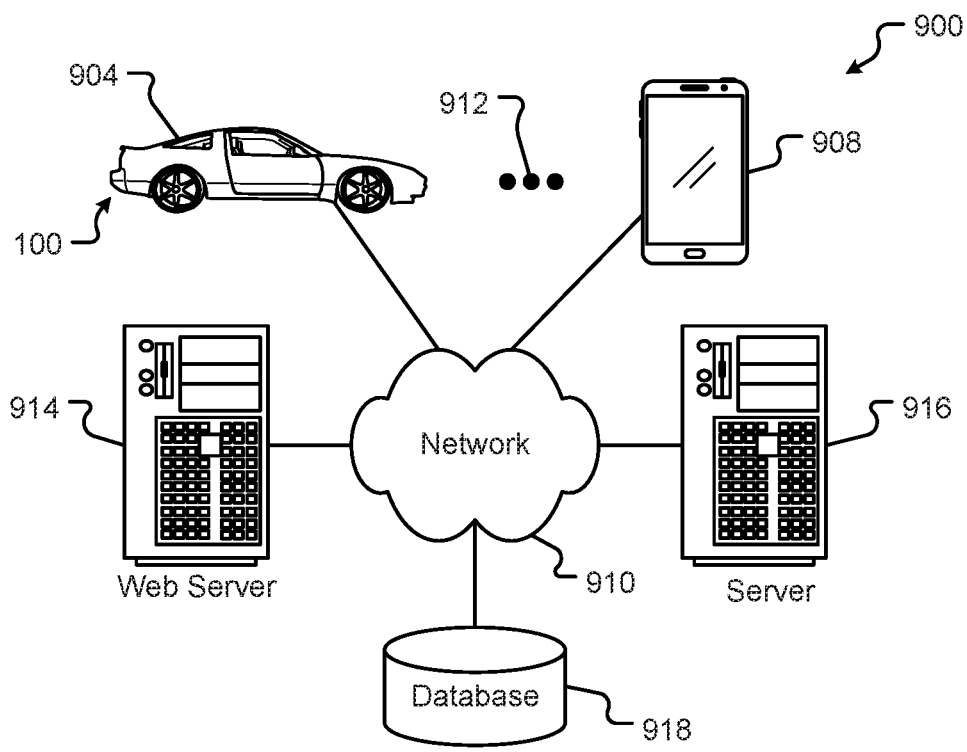
FIG. 9 is a block diagram of a computing environment associated with the embodiments presented herein.

FIG. 9 illustrates a block diagram of a computing environment 900 that may function as the servers, user computers, or other systems provided and described herein. The environment 900 includes one or more user computers, or computing devices, such as a vehicle computing device 904, a communication device 908, and/or more 912. The computing devices 904, 908, 912 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 904, 908, 912 may also have any of a variety of applications, including for example, database client and/or server applications, and web browser applications. Alternatively, the computing devices 904, 908, 912 may be any other electronic device, such as a thin-client computer, Internet-enabled mobile telephone, and/or personal digital assistant, capable of communicating via a network 910 and/or displaying and navigating web pages or other types of electronic documents. Although the exemplary computer environment 900 is shown with two computing devices, any number of user computers or computing devices may be supported.

Environment 900 further includes a network 910. The network 910 may can be any type of network familiar to those skilled in the art that can support data communications using any of a variety of commercially-available protocols, including without limitation SIP, TCP/IP, SNA, IPX, AppleTalk, and the like. Merely by way of example, the network 910 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 914, 916. In this example, server 914 is shown as a web server and server 916 is shown as an application server. The web server 914, which may be used to process requests for web pages or other electronic documents from computing devices 904, 908, 912. The web server 914 can be running an operating system including any of those discussed above, as well as any commercially-available server operating systems. The web server 914 can also run a variety of server applications, including SIP (Session Initiation Protocol) servers, HTTP(s) servers, FTP servers, CGI servers, database servers, Java servers, and the like. In some instances, the web server 914 may publish operations available operations as one or more web services.

The environment 900 may also include one or more file and or/application servers 916, which can, in addition to an operating system, include one or more applications accessible by a client running on one or more of the computing devices 904, 908, 912. The server(s) 916 and/or 914 may be one or more general purpose computers capable of executing programs or scripts in response to the computing devices 904, 908, 912. As one example, the server 916, 914 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 916 may also include database servers, including without limitation those commercially available from Oracle®, Microsoft®, Sybase®, IBM® and the like, which can process requests from database clients running on a computing device 904, 908, 912.

The web pages created by the server 914 and/or 916 may be forwarded to a computing device 904, 908, 912 via a web (file) server 914, 916. Similarly, the web server 914 may be able to receive web page requests, web services invocations, and/or input data from a computing device 904, 908, 912 (e.g., a user computer, etc.) and can forward the web page requests and/or input data to the web (application) server 916. In further embodiments, the server 916 may function as a file server. Although for ease of description, FIG. 9 illustrates a separate web server 914 and file/application server 916, those skilled in the art will recognize that the functions described with respect to servers 914, 916 may be performed by a single server and/or a plurality of specialized servers, depending on implementation-specific needs and parameters. The computer systems 904, 908, 912, web (file) server 914 and/or web (application) server 916 may function as the system, devices, or components described in FIGS. 1-9.

The environment 900 may also include a database 918. The database 918 may reside in a variety of locations. By way of example, database 918 may reside on a storage medium local to (and/or resident in) one or more of the computers 904, 908, 912, 914, 916. Alternatively, it may be remote from any or all of the computers 904, 908, 912, 914, 916, and in communication (e.g., via the network 910) with one or more of these. The database 918 may reside in a storage-area network ("SAN") familiar to those skilled in the art. Similarly, any necessary files for performing the functions attributed to the computers 904, 908, 912, 914, 916 may be stored locally on the respective computer and/or remotely, as appropriate. The database 918 may be a relational database, such as Oracle 20i®, that is adapted to store, update, and retrieve data in response to SQL-formatted commands.

Figure 10:
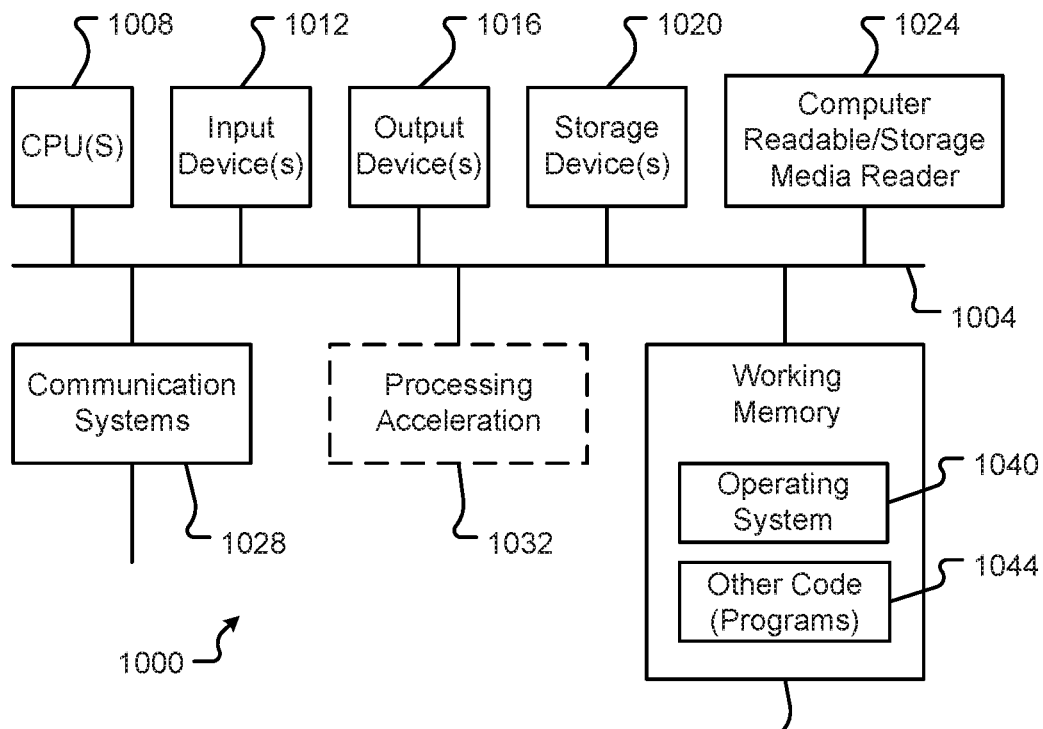
FIG. 10 is a block diagram of a computing device associated with one or more components described herein.

FIG. 10 illustrates one embodiment of a computer system 1000 upon which the servers, user computers, computing devices, or other systems or components described above may be deployed or executed. The computer system 1000 is shown comprising hardware elements that may be electrically coupled via a bus 1004. The hardware elements may include one or more central processing units (CPUs) 1008; one or more input devices 1012 (e.g., a mouse, a keyboard, etc.); and one or more output devices 1016 (e.g., a display device, a printer, etc.). The computer system 1000 may also include one or more storage devices 1020. By way of example, storage device(s) 1020 may be disk drives, optical storage devices, solid-state storage devices such as a random access memory ("RAM") and/or a read-only memory ("ROM"), which can be programmable, flash-updateable and/or the like.

The computer system 1000 may additionally include a computer-readable storage media reader 1024; a communications system 1028 (e.g., a modem, a network card (wireless or wired), an infra-red communication device, etc.); and working memory 1036, which may include RAM and ROM devices as described above. The computer system 1000 may also include a processing acceleration unit 1032, which can include a DSP, a special-purpose processor, and/or the like.

The computer-readable storage media reader 1024 can further be connected to a computer-readable storage medium, together (and, optionally, in combination with storage device(s) 1020) comprehensively representing remote, local, fixed, and/or removable storage devices plus storage media for temporarily and/or more permanently containing computer-readable information. The communications system 1028 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 1000 may also comprise software elements, shown as being currently located within a working memory 1036, including an operating system 1040 and/or other code 1044. It should be appreciated that alternate embodiments of a computer system 1000 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 1008 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture. Various Graphics Processing Units (GPUs) can additionally or alternatively be used in various implementations. For example, GPU hardware such as nVidia GTX 1080, Titan X, etc. can be used for deep neural network training and inference. Additionally, or alternatively, special purpose computing units such as Google Tensor Processing Units (TPUs), for example, can be used for this purpose. Various other processors are contemplated and considered to be within the scope of the present disclosure.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a method for providing an augmented reality user manual for a vehicle, the method comprising: creating, by one or more processors, a three-dimensional model of the vehicle and content of the user manual; training, by the one or more processors, a neural network to recognize a plurality of views of the vehicle and associate each view with a portion of the three-dimensional model of the vehicle; and rendering, by a mobile device, a portion of the three-dimensional model of the vehicle and a portion of the content of the user manual overlaid on an image of the vehicle captured by a camera of the mobile device based on the image of the vehicle captured by the camera of the mobile device and the association of one or more views with one or more portions of the three-dimensional model of the vehicle in the trained neural network.

Aspects of the above method include wherein creating the three-dimensional model of the vehicle and the content of the user manual further comprises: creating a three-dimensional model of the interior of the vehicle and a three-dimensional model of the exterior of the vehicle; identifying one or more features of the vehicle; creating a three-dimensional model and content of the user manual for each identified feature; defining a common reference point between each of the three-dimensional models with respect to each other; aligning, in position and orientation based on the common reference point, the three-dimensional model and content of the user manual for each identified feature with at least one of the three-dimensional model of the interior of the vehicle or the three-dimensional model of the exterior of the vehicle.

Aspects of the above method include wherein identifying one or more features of the vehicle and creating the content of the user manual for each identified feature further comprises: organizing the features in a hierarchical tree structure having a plurality of feature nodes, each feature node representing one of the identified features of the vehicle and wherein each feature node can have one or more child features.

Aspects of the above method include wherein training the neural network further comprises: creating a set of images of an interior of the vehicle from a known camera position and orientation for each image; creating a set of images of an exterior of the vehicle from a known camera position and orientation for each image; creating a set of images of each of one or more features of the vehicle from a known camera position and orientation for each image; storing each created image with a known camera pose for the image based on the known camera position and orientation for the image; training the neural network with image data for the stored created images and the known camera pose for each image to provide camera pose data for a given image; and storing the trained neural network.

Aspects of the above method include wherein creating sets of images comprises rendering images using the model of the vehicle from known virtual camera position and orientation for each image or capturing images with real cameras from known camera position and orientation for each image.

Aspects of the above method include wherein creating sets of images is repeated under various different lighting conditions by modulating the physical or virtual lights or under various weather conditions.

Aspects of the above method include wherein rendering the portion of the model of the vehicle and the portion of the content of the user manual overlaid on the image of the vehicle further comprises: capturing an image of the vehicle through the camera of the mobile device; calculating one or more intrinsic parameters for the camera of the mobile device; estimating a camera pose position for the captured image using the stored trained neural network; finding one or more relevant features of the vehicle based on the estimated camera pose position for the captured image; rendering on a display of the captured image one or both of an illustration of the three-dimensional model of each relevant feature or content of the user manual related to each relevant feature.

Aspects of the above method include wherein estimating camera pose position further comprises regressing the camera pose position and rotation of the camera using forward propagation on the stored trained neural network and the three-dimensional model of the vehicle.

Aspects of the above method include wherein estimating camera pose position for the captured image using the stored trained neural network further comprises preprocessing the captured image to remove any obstructions in the scene.

Aspects of the above method include wherein regressing the camera pose position and rotation of the camera using forward propagation on the stored trained neural network further comprises tuning the model based on the regressed camera position.

Aspects of the above method include wherein finding one or more relevant features of the vehicle comprises finding all features of the vehicle within a field of view of the camera represented by the captured image.

Aspects of the above method include wherein finding one or more relevant features of the vehicle comprises finding all features of the vehicle within a field of view of the camera represented by the captured image and selecting one or more features closest to the center of the field of view of the camera.

Aspects of the above method include wherein finding one or more relevant features of the vehicle comprises finding all features of the vehicle within a field of view of the camera represented by the captured image and receiving a user selection of one or more features.

Aspects of the above method include wherein finding one or more relevant features of the vehicle comprises finding all features of the vehicle within a field of view of the camera represented by the captured image and navigating down the feature hierarchy tree with manual or automatic selection based on context.

Aspects of the above method include wherein finding one or more relevant features of the vehicle comprises interactively guiding the user to point the mobile device towards another part of the vehicle, based on a context of user interest or a concurrent troubleshooting process.

Aspects of the above method include wherein rendering on a display of the captured image one or both of an illustration of the three-dimensional model of each relevant feature or content of the user manual related to each relevant feature comprises: calculating a three-dimensional perspective projection matrix for the captured image using the calculated one or more intrinsic parameters for the camera of the mobile device; and calculating a model view matrix for the three-dimensional model of each relevant feature based on the estimated camera pose and any additional translation and rotation for the relevant feature.

Aspects of the above method include wherein rendering on a display of the captured image one or both of an illustration of the three-dimensional model of each relevant feature or content of the user manual related to each relevant feature comprises rendering one or more animations.

Aspects of the above method include wherein rendering on a display of the captured image one or both of an illustration of the three-dimensional model of each relevant feature or content of the user manual related to each relevant feature further comprises preprocessing the captured image to not render over any obstructions in the scene.

Aspects of the above method include wherein rendering on a display of the captured image comprises rendering three-dimensional textual annotations in perspective, rendering two-dimensional textual annotations with orthographic projection, augmenting the display of the captured image with audio in the form of voice instructions or explanations through a speaker, or one or more combinations of using static three-dimensional rendering, animations, two-dimensional text, three-dimensional text, and audio.

Aspects of the above method include wherein the captured image comprises a video and wherein rendering the portion of the model of the vehicle and the portion of the content of the user manual overlaid on the image of the vehicle further comprises repeating said estimating camera pose position, finding one or more relevant features of the vehicle based on the estimated camera pose position, and rendering on the display of the captured image the illustration of the three-dimensional model of each relevant feature or the content of the user manual related to each relevant feature for each subsequent frame of the video.

Embodiments include a system comprising: one or more processors; and a memory coupled with and readable by the one or more processors and storing therein a set of instructions which, when executed by the one or more processors, causes the processors to provide an augmented reality user manual for a vehicle by: creating a three-dimensional model of the vehicle and content of the user manual; training a neural network to recognize a plurality of views of the vehicle and associate each view with a portion of the three-dimensional model of the vehicle; and rendering a portion of the three-dimensional model of the vehicle and a portion of the content of the user manual overlaid on an image of the vehicle captured by a camera of a mobile device based on the image of the vehicle captured by the camera of the mobile device and the association of one or more views with one or more portions of the three-dimensional model of the vehicle in the trained neural network.

Aspects of the above system include wherein creating the three-dimensional model of the vehicle and the content of the user manual further comprises: creating a three-dimensional model of the interior of the vehicle and a three-dimensional model of the exterior of the vehicle; identifying one or more features of the vehicle; creating a three-dimensional model and content of the user manual for each identified feature; defining a common reference point between each of the three-dimensional models with respect to each other; aligning, in position and orientation based on the common reference point, the three-dimensional model and content of the user manual for each identified feature with at least one of the three-dimensional model of the interior of the vehicle or the three-dimensional model of the exterior of the vehicle.

Aspects of the above system include wherein identifying one or more features of the vehicle and creating the content of the user manual for each identified feature further comprises: organizing the features in a hierarchical tree structure having a plurality of feature nodes, each feature node representing one of the identified features of the vehicle and wherein each feature node can have one or more child features.

Aspects of the above system include wherein training the neural network further comprises: creating a set of images of an interior of the vehicle from a known camera position and orientation for each image; creating a set of images of an exterior of the vehicle from a known camera position and orientation for each image; creating a set of images of each of one or more features of the vehicle from a known camera position and orientation for each image; storing each created image with a known camera pose for the image based on the known camera position and orientation for the image; training the neural network with image data for the stored created images and the known camera pose for each image to provide camera pose data for a given image; and storing the trained neural network.

Aspects of the above system include wherein creating sets of images comprises rendering images using the model of the vehicle from known virtual camera position and orientation for each image or capturing images with real cameras from known camera position and orientation for each image.

Aspects of the above system include wherein creating sets of images is repeated under various different lighting conditions by modulating the physical or virtual lights or under various weather conditions.

Aspects of the above system include wherein rendering the portion of the model of the vehicle and the portion of the content of the user manual overlaid on the image of the vehicle further comprises: capturing an image of the vehicle through the camera of the mobile device; calculating one or more intrinsic parameters for the camera of the mobile device; estimating a camera pose position for the captured image using the stored trained neural network; finding one or more relevant features of the vehicle based on the estimated camera pose position for the captured image; rendering on a display of the captured image one or both of an illustration of the three-dimensional model of each relevant feature or content of the user manual related to each relevant feature.

Aspects of the above system include wherein estimating camera pose position further comprises regressing the camera pose position and rotation of the camera using forward propagation on the stored trained neural network and the three-dimensional model of the vehicle.

Aspects of the above system include wherein estimating camera pose position for the captured image using the stored trained neural network further comprises preprocessing the captured image to remove any obstructions in the scene.

Aspects of the above system include wherein regressing the camera pose position and rotation of the camera using forward propagation on the stored trained neural network further comprises tuning the model based on the regressed camera position.

Aspects of the above system include wherein finding one or more relevant features of the vehicle comprises finding all features of the vehicle within a field of view of the camera represented by the captured image.

Aspects of the above system include wherein finding one or more relevant features of the vehicle comprises finding all features of the vehicle within a field of view of the camera represented by the captured image and selecting one or more features closest to the center of the field of view of the camera.

Aspects of the above system include wherein finding one or more relevant features of the vehicle comprises finding all features of the vehicle within a field of view of the camera represented by the captured image and receiving a user selection of one or more features.

Aspects of the above system include wherein finding one or more relevant features of the vehicle comprises finding all features of the vehicle within a field of view of the camera represented by the captured image and navigating down the feature hierarchy tree with manual or automatic selection based on context.

Aspects of the above system include wherein finding one or more relevant features of the vehicle comprises interactively guiding the user to point the mobile device towards another part of the vehicle, based on a context of user interest or a concurrent troubleshooting process.

Aspects of the above system include wherein rendering on a display of the captured image one or both of an illustration of the three-dimensional model of each relevant feature or content of the user manual related to each relevant feature comprises: calculating a three-dimensional perspective projection matrix for the captured image using the calculated one or more intrinsic parameters for the camera of the mobile device; and calculating a model view matrix for the three-dimensional model of each relevant feature based on the estimated camera pose and any additional translation and rotation for the relevant feature.

Aspects of the above system include wherein rendering on a display of the captured image one or both of an illustration of the three-dimensional model of each relevant feature or content of the user manual related to each relevant feature comprises rendering one or more animations.

Aspects of the above system include wherein rendering on a display of the captured image one or both of an illustration of the three-dimensional model of each relevant feature or content of the user manual related to each relevant feature further comprises preprocessing the captured image to not render over any obstructions in the scene.

Aspects of the above system include wherein rendering on a display of the captured image comprises rendering three-dimensional textual annotations in perspective, rendering two-dimensional textual annotations with orthographic projection, augmenting the display of the captured image with audio in the form of voice instructions or explanations through a speaker, or one or more combinations of using static three-dimensional rendering, animations, two-dimensional text, three-dimensional text, and audio.

Aspects of the above system include wherein the captured image comprises a video and wherein rendering the portion of the model of the vehicle and the portion of the content of the user manual overlaid on the image of the vehicle further comprises repeating said estimating camera pose position, finding one or more relevant features of the vehicle based on the estimated camera pose position, and rendering on the display of the captured image the illustration of the three-dimensional model of each relevant feature or the content of the user manual related to each relevant feature for each subsequent frame of the video.

Embodiments include a non-transitory computer-readable medium comprising a set of instructions stored therein which, when executed by a processor, causes the processor to provide an augmented reality user manual for a vehicle by: creating a three-dimensional model of the vehicle and content of the user manual; training a neural network to recognize a plurality of views of the vehicle and associate each view with a portion of the three-dimensional model of the vehicle; and rendering a portion of the three-dimensional model of the vehicle and a portion of the content of the user manual overlaid on an image of the vehicle captured by a camera of a mobile device based on the image of the vehicle captured by the camera of the mobile device and the association of one or more views with one or more portions of the three-dimensional model of the vehicle in the trained neural network.

Aspects of the above non-transitory computer-readable medium include wherein creating the three-dimensional model of the vehicle and the content of the user manual further comprises: creating a three-dimensional model of the interior of the vehicle and a three-dimensional model of the exterior of the vehicle; identifying one or more features of the vehicle; creating a three-dimensional model and content of the user manual for each identified feature; defining a common reference point between each of the three-dimensional models with respect to each other; aligning, in position and orientation based on the common reference point, the three-dimensional model and content of the user manual for each identified feature with at least one of the three-dimensional model of the interior of the vehicle or the three-dimensional model of the exterior of the vehicle.

Aspects of the above non-transitory computer-readable medium include wherein identifying one or more features of the vehicle and creating the content of the user manual for each identified feature further comprises: organizing the features in a hierarchical tree structure having a plurality of feature nodes, each feature node representing one of the identified features of the vehicle and wherein each feature node can have one or more child features.

Aspects of the above non-transitory computer-readable medium include wherein training the neural network further comprises: creating a set of images of an interior of the vehicle from a known camera position and orientation for each image; creating a set of images of an exterior of the vehicle from a known camera position and orientation for each image; creating a set of images of each of one or more features of the vehicle from a known camera position and orientation for each image; storing each created image with a known camera pose for the image based on the known camera position and orientation for the image; training the neural network with image data for the stored created images and the known camera pose for each image to provide camera pose data for a given image; and storing the trained neural network.

Aspects of the above non-transitory computer-readable medium include wherein creating sets of images comprises rendering images using the model of the vehicle from known virtual camera position and orientation for each image or capturing images with real cameras from known camera position and orientation for each image.

Aspects of the above non-transitory computer-readable medium include wherein creating sets of images is repeated under various different lighting conditions by modulating the physical or virtual lights or under various weather conditions.

Aspects of the above non-transitory computer-readable medium include wherein rendering the portion of the model of the vehicle and the portion of the content of the user manual overlaid on the image of the vehicle further comprises: capturing an image of the vehicle through the camera of the mobile device; calculating one or more intrinsic parameters for the camera of the mobile device; estimating a camera pose position for the captured image using the stored trained neural network; finding one or more relevant features of the vehicle based on the estimated camera pose position for the captured image; rendering on a display of the captured image one or both of an illustration of the three-dimensional model of each relevant feature or content of the user manual related to each relevant feature.

Aspects of the above non-transitory computer-readable medium include wherein estimating camera pose position further comprises regressing the camera pose position and rotation of the camera using forward propagation on the stored trained neural network and the three-dimensional model of the vehicle.

Aspects of the above non-transitory computer-readable medium include wherein estimating camera pose position for the captured image using the stored trained neural network further comprises preprocessing the captured image to remove any obstructions in the scene.

Aspects of the above non-transitory computer-readable medium include wherein regressing the camera pose position and rotation of the camera using forward propagation on the stored trained neural network further comprises tuning the model based on the regressed camera position.

Aspects of the above non-transitory computer-readable medium include wherein finding one or more relevant features of the vehicle comprises finding all features of the vehicle within a field of view of the camera represented by the captured image.

Aspects of the above non-transitory computer-readable medium include wherein finding one or more relevant features of the vehicle comprises finding all features of the vehicle within a field of view of the camera represented by the captured image and selecting one or more features closest to the center of the field of view of the camera.

Aspects of the above non-transitory computer-readable medium include wherein finding one or more relevant features of the vehicle comprises finding all features of the vehicle within a field of view of the camera represented by the captured image and receiving a user selection of one or more features.

Aspects of the above non-transitory computer-readable medium include wherein finding one or more relevant features of the vehicle comprises finding all features of the vehicle within a field of view of the camera represented by the captured image and navigating down the feature hierarchy tree with manual or automatic selection based on context.

Aspects of the above non-transitory computer-readable medium include wherein finding one or more relevant features of the vehicle comprises interactively guiding the user to point the mobile device towards another part of the vehicle, based on a context of user interest or a concurrent troubleshooting process.

Aspects of the above non-transitory computer-readable medium include wherein rendering on a display of the captured image one or both of an illustration of the three-dimensional model of each relevant feature or content of the user manual related to each relevant feature comprises: calculating a three-dimensional perspective projection matrix for the captured image using the calculated one or more intrinsic parameters for the camera of the mobile device; and calculating a model view matrix for the three-dimensional model of each relevant feature based on the estimated camera pose and any additional translation and rotation for the relevant feature.

Aspects of the above non-transitory computer-readable medium include wherein rendering on a display of the captured image one or both of an illustration of the three-dimensional model of each relevant feature or content of the user manual related to each relevant feature comprises rendering one or more animations.

Aspects of the above non-transitory computer-readable medium include wherein rendering on a display of the captured image one or both of an illustration of the three-dimensional model of each relevant feature or content of the user manual related to each relevant feature further comprises preprocessing the captured image to not render over any obstructions in the scene.

Aspects of the above non-transitory computer-readable medium include wherein rendering on a display of the captured image comprises rendering three-dimensional textual annotations in perspective, rendering two-dimensional textual annotations with orthographic projection, augmenting the display of the captured image with audio in the form of voice instructions or explanations through a speaker, or one or more combinations of using static three-dimensional rendering, animations, two-dimensional text, three-dimensional text, and audio.

Aspects of the above non-transitory computer-readable medium include wherein the captured image comprises a video and wherein rendering the portion of the model of the vehicle and the portion of the content of the user manual overlaid on the image of the vehicle further comprises repeating said estimating camera pose position, finding one or more relevant features of the vehicle based on the estimated camera pose position, and rendering on the display of the captured image the illustration of the three-dimensional model of each relevant feature or the content of the user manual related to each relevant feature for each subsequent frame of the video.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A method for providing an augmented reality user manual for a vehicle, the method comprising:
    creating, by one or more processors, a three-dimensional model of the vehicle and content of the user manual;
    identifying, by the one or more processors, one or more features of the vehicle;
    creating, by the one or more processors, a three-dimensional model and content of the user manual for each identified feature;
    organizing, by the one or more processors, the identified one or more features and the created content of the user manual in a hierarchical tree structure having a plurality of feature nodes, each feature node representing one of the identified one or more features of the vehicle or created content of the user manual and wherein at least one feature node representing an identified feature of the vehicle has at least one child representing created content of the user manual related to the identified feature;
    training, by the one or more processors, a neural network to recognize a plurality of views of the vehicle and associate each view with a portion of the three-dimensional model of the vehicle;
    capturing, by a mobile device, an image of the vehicle through a camera of the mobile device;
    calculating, by the mobile device, one or more intrinsic parameters for the camera of the mobile device, the one or more intrinsic parameters comprising one or more of a focal length, an image sensor format, and a principal point;
    estimating, by the mobile device, a camera pose for the captured image using the trained neural network, wherein the estimated camera pose comprises a camera position and a camera rotation for the camera when capturing the image of the vehicle;
    finding, by the mobile device, one or more relevant features of the vehicle based on the estimated camera pose position for the captured image; and
    rendering, by the mobile device, a portion of the three-dimensional model of the vehicle and a portion of the content of the user manual overlaid on the image of the vehicle captured by a camera of the mobile device based on the image of the vehicle captured by the camera of the mobile device, the estimated camera pose for the captured image, the calculated one or more intrinsic parameters of the camera, and the association of one or more views with one or more portions of the three-dimensional model of the vehicle in the trained neural network, wherein the portion of the three-dimensional model of the vehicle rendered by the mobile device provides an augmented view of one or more features of the vehicle, the one or more features comprising at least one physical feature of the vehicle otherwise hidden from view of a user of the mobile device.

2. The method of claim 1, wherein creating the three-dimensional model of the vehicle and the content of the user manual further comprises:
   creating a three-dimensional model of an interior of the vehicle and a three-dimensional model of an exterior of the vehicle;
   defining a common reference point between each of the three-dimensional models with respect to each other;
   aligning, in position and orientation based on the common reference point, the three-dimensional model and content of the user manual for each identified feature with at least one of the three-dimensional model of the interior of the vehicle or the three-dimensional model of the exterior of the vehicle.

3. The method of claim 2, wherein rendering the portion of the model of the vehicle and the portion of the content of the user manual overlaid on the image of the vehicle further comprises:
   rendering on a display of the captured image one or both of an illustration of the three-dimensional model of each relevant feature or content of the user manual related to each relevant feature.

4. The method of claim 3, wherein estimating camera pose position further comprises regressing the camera pose position and rotation of the camera using forward propagation on the trained neural network and the three-dimensional model of the vehicle.

5. The method of claim 4, wherein regressing the camera pose position and rotation of the camera using forward propagation on the trained neural network further comprises tuning the three-dimensional model of the vehicle based on the regressed camera pose position.

6. The method of claim 3, wherein estimating camera pose position for the captured image using the trained neural network further comprises preprocessing the captured image to remove any obstructions in a scene.

7. The method of claim 3, wherein finding one or more relevant features of the vehicle comprises finding all features of the vehicle within a field of view of the camera represented by the captured image.

8. The method of claim 3, wherein finding one or more relevant features of the vehicle comprises finding all features of the vehicle within a field of view of the camera represented by the captured image and selecting one or more features closest to a center of the field of view of the camera.

9. The method of claim 3, wherein finding one or more relevant features of the vehicle comprises finding all features of the vehicle within a field of view of the camera represented by the captured image and receiving a user selection of one or more features.

10. The method of claim 3, wherein finding one or more relevant features of the vehicle comprises finding all features of the vehicle within a field of view of the camera represented by the captured image and navigating down the feature hierarchy tree structure with manual or automatic selection based on context.

11. The method of claim 3, wherein finding one or more relevant features of the vehicle comprises interactively guiding the user to point the mobile device towards another part of the vehicle, based on a context of user interest or a concurrent troubleshooting process.

12. The method of claim 3, wherein rendering on a display of the captured image one or both of an illustration of the three-dimensional model of each relevant feature or content of the user manual related to each relevant feature comprises:
   calculating a three-dimensional perspective projection matrix for the captured image using the calculated one or more intrinsic parameters for the camera of the mobile device; and
   calculating a model view matrix for the three-dimensional model of each relevant feature based on the estimated camera pose and any additional translation and rotation for the relevant feature.

13. The method of claim 3, wherein rendering on a display of the captured image one or both of an illustration of the three-dimensional model of each relevant feature or content of the user manual related to each relevant feature comprises rendering one or more animations.

14. The method of claim 3, wherein rendering on a display of the captured image one or both of an illustration of the three-dimensional model of each relevant feature or content of the user manual related to each relevant feature further comprises preprocessing the captured image to not render over any obstructions in a scene.

15. The method of claim 3, wherein rendering on the display of the captured image one or both of an illustration of the three-dimensional model of each relevant feature or content of the user manual related to each relevant feature comprises rendering three-dimensional textual annotations in perspective, rendering two-dimensional textual annotations with orthographic projection, augmenting the display of the captured image with audio in a form of voice instructions or explanations through a speaker, or one or more combinations of using static three-dimensional rendering, animations, two-dimensional text, three-dimensional text, and audio.

16. The method of claim 3, wherein the captured image comprises a video and wherein rendering the portion of the three-dimensional model of the vehicle and the portion of the content of the user manual overlaid on the image of the vehicle further comprises repeating said estimating camera pose position, finding one or more relevant features of the vehicle based on the estimated camera pose position, and rendering on the display of the captured image the illustration of the three-dimensional model of each relevant feature or the content of the user manual related to each relevant feature for each subsequent frame of the video.

17. The method of claim 1, wherein training the neural network further comprises:
   creating a set of images of an interior of the vehicle from a known camera position and orientation for each image;
   creating a set of images of an exterior of the vehicle from a known camera position and orientation for each image;
   creating a set of images of each of one or more features of the vehicle from a known camera position and orientation for each image;
   storing each created image of the interior of the vehicle, each created image of the exterior of the vehicle, and each created image of the one or more features of the vehicle with a known camera pose for each stored image based on the known camera position and orientation for the image;

training the neural network with image data for the stored images and the known camera pose for each stored image to provide camera pose data for a given image; and storing the trained neural network.

18. The method of claim 17, wherein creating sets of images comprises rendering images using the three-dimensional model of the vehicle from known virtual camera position and orientation for each image or capturing images with real cameras from known camera position and orientation for each image.

19. The method of claim 17, wherein creating sets of images is repeated under various different lighting conditions by modulating physical or virtual lights or under various weather conditions.

20. A system comprising:

a server comprising a processor and a memory coupled with and readable by the processor and storing therein a set of instructions which, when executed by the processor, causes the processor to provide an augmented reality user manual for a vehicle by:

creating a three-dimensional model of the vehicle and content of the user manual, identifying one or more features of the vehicle, creating a three-dimensional model and content of the user manual for each identified feature, organizing the identified one or more features and the created content of the user manual in a hierarchical tree structure having a plurality of feature nodes, each feature node representing one of the identified one or more features of the vehicle or created content of the user manual and wherein at least one feature node representing an identified feature of the vehicle has at least one child representing created content of the user manual related to the identified feature, and training a neural network to recognize a plurality of views of the vehicle and associate each view with a portion of the three-dimensional model of the vehicle; and a mobile device comprising a processor and a memory coupled with and readable by the processor and storing therein a set of instructions which, when executed by the processor, causes the processor to provide the augmented reality user manual for the vehicle by:

capturing an image of the vehicle through a camera of the mobile device;

calculating one or more intrinsic parameters for the camera of the mobile device, the one or more intrinsic parameters comprising one or more of a focal length, an image sensor format, and a principal point;

estimating a camera pose for the captured image using the trained neural network, wherein the estimated camera pose comprises a camera position and a camera rotation for the camera when capturing the image of the vehicle;

finding one or more relevant features of the vehicle based on the estimated camera pose position for the captured image; and rendering a portion of the three-dimensional model of the vehicle and a portion of the content of the user manual overlaid on the image of the vehicle captured by the camera of the mobile device based on the image of the vehicle captured by the camera of the mobile device, the estimated camera pose for the captured image, the calculated one or more intrinsic parameters of the camera, and the association of one or more views with one or more portions of the three-dimensional model of the vehicle in the trained neural network, wherein the portion of the three-dimensional model of the vehicle rendered by the mobile device provides an augmented view of one or more features of the vehicle, the one or more features comprising at least one physical feature of the vehicle otherwise hidden from view of a user of the mobile device.

21. A non-transitory computer-readable medium comprising a set of instructions stored therein which, when executed by the processor, causes the processor to provide an augmented reality user manual for a vehicle by:

creating a three-dimensional model of the vehicle and content of a user manual;

identifying one or more features of the vehicle;

creating a three-dimensional model and content of the user manual for each identified feature;

organizing the identified one or more features and the created content of the user manual in a hierarchical tree structure having a plurality of feature nodes, each feature node representing one of the identified one or more features of the vehicle or created content of the user manual and wherein at least one feature node representing an identified feature of the vehicle has at least one child representing created content of the user manual related to the identified feature;

training a neural network to recognize a plurality of views of the vehicle and associate each view with a portion of the three-dimensional model of the vehicle;

capturing an image of the vehicle through a camera of a mobile device;

calculating one or more intrinsic parameters for the camera of the mobile device, the one or more intrinsic parameters comprising one or more of a focal length, an image sensor format, and a principal point;

estimating a camera pose for the captured image using the trained neural network, wherein the estimated camera pose comprises a camera position and a camera rotation for the camera when capturing the image of the vehicle;

finding one or more relevant features of the vehicle based on the estimated camera pose position for the captured image; and rendering a portion of the three-dimensional model of the vehicle and a portion of the content of the user manual overlaid on the image of the vehicle captured by the camera of the mobile device based on the image of the vehicle captured by the camera of the mobile device, the estimated camera pose for the captured image, the calculated one or more intrinsic parameters of the camera, and the association of one or more views with one or more portions of the three-dimensional model of the vehicle in the trained neural network, wherein the portion of the three-dimensional model of the vehicle rendered by the mobile device provides an augmented view of one or more features of the vehicle, the one or more features comprising at least one physical feature of the vehicle otherwise hidden from view of a user of the mobile device.

* * * * *

UNITED STATES PATENT AND TRADEMARK OFFICE
CERTIFICATE OF CORRECTION

Page 1 of 1

PATENT NO. : 10,885,712 B2
APPLICATION NO. : 15/648271
DATED : January 5, 2021
INVENTOR(S) : Vidya Elangovan et al.

It is certified that error appears in the above-identified patent and that said Letters Patent is hereby corrected as shown below:

In the Claims

Claim 3, Column 25, Line 22, delete "model" and insert --three-dimensional model-- therein.
Claim 21, Column 28, Line 15, delete "the processor" and insert --a processor-- therein.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*